(12) United States Patent
Zolnay

(10) Patent No.: US 8,368,957 B2
(45) Date of Patent: Feb. 5, 2013

(54) METHOD FOR DIGITAL IMAGE ADAPTATION FOR PRINTING AN IMAGE ON A PRINTING APPARATUS

(75) Inventor: András G. Zolnay, Tholen (NL)

(73) Assignee: Oce Technologies B.V., Venlo (NL)

( * ) Notice: Subject to any disclaimer, the term of this patent is extended or adjusted under 35 U.S.C. 154(b) by 0 days.

(21) Appl. No.: 13/479,031

(22) Filed: May 23, 2012

(65) Prior Publication Data

US 2012/0229827 A1    Sep. 13, 2012

Related U.S. Application Data

(63) Continuation of application No. PCT/EP2010/068045, filed on Nov. 23, 2010.

(30) Foreign Application Priority Data

Nov. 24, 2009    (EP) ..................................... 09176858

(51) Int. Cl.
*H04N 1/60*    (2006.01)
*G03F 3/08*    (2006.01)
(52) U.S. Cl. ........................... 358/1.9; 358/518; 358/520
(58) Field of Classification Search ........................ None
See application file for complete search history.

(56) References Cited

U.S. PATENT DOCUMENTS

2007/0052719 A1    3/2007    Tin
2007/0188780 A1    8/2007    Edge

FOREIGN PATENT DOCUMENTS

| EP | 2023601 A1 | 2/2009 |
| JP | 2005-318391 A | 11/2005 |
| JP | 2006-014193 A | 1/2006 |

OTHER PUBLICATIONS

Stone et al., "Color gamut mapping and the printing of digital color images", ACM Transactions on Graphics, Oct. 1, 1988, vol. 7, No. 4, pp. 249-292, XP 000600596.

*Primary Examiner* — Twyler Haskins
*Assistant Examiner* — Christopher D Wait
(74) *Attorney, Agent, or Firm* — Birch, Stewart, Kolasch & Birch, LLP

(57) ABSTRACT

An image dependent gamut mapping method for mapping source colors of an image to destination colors reproducible by a printing apparatus, each source color having a lightness component within a range between a source white point and a source black point, and each destination color having a lightness component within a range between a destination white point and a destination black point. A composed transfer function maps the source white point onto the destination white point and the source black point onto the destination black point, applying the composed transfer function on each lightness component of source colors of at least a part of the image. The transfer function is composed of linear mappings. The steepness of each linear mapping is determined by a mathematical optimization problem intended to preserve lightness and contrast in the image produced by the printing apparatus under the conditions of at least one constraint.

14 Claims, 9 Drawing Sheets

METHOD FOR DIGITAL IMAGE ADAPTATION FOR PRINTING AN IMAGE ON A PRINTING APPARATUS

CROSS-REFERENCE TO RELATED APPLICATIONS

This application is a Continuation of International Application No. PCT/EP2010/068045, filed on Nov. 23, 2010, and for which priority is claimed under 35 U.S.C. §120, and which claims priority under 35 U.S.C. §119 to application Ser. No. 09/176,858.0, filed in Europe on Nov. 24, 2009. The entirety of each of the above-identified applications is expressly incorporated herein by reference.

BACKGROUND OF THE INVENTION

1. Field of the Invention

The present invention relates to an image dependent gamut mapping method for mapping source colors of an image to destination colors reproducible by a printing apparatus, said source colors and destination colors being part of a color space comprising a lightness axis, each source color having a lightness component within a range between a source white point and a source black point on the lightness axis, and each destination color having a lightness component within a range between a destination white point and a destination black point on the lightness axis, the method comprising the steps of determining a composed transfer function which maps the source white point onto the destination white point and the source black point onto the destination black point and applying the composed transfer function on each lightness component of source colors of at least a part of the image.

2. Background of the Invention

A digital image consists of pixels that are defined as points in a color space, e.g. an RGB color space, an XYZ color space or an L*a*b* color space. In an RGB color space, each pixel is defined by three coordinates that represent the red, green and blue color component of the pixel respectively. In a L*a*b* color space each pixel is defined by three coordinates which represent the lightness of the pixel, its position between red/magenta and green and its position between yellow and blue, respectively. Each coordinate represents a property of each point in the color space.

A gamut may be defined as a specific part of the color space. For example, an image gamut of a digital image may be defined as the part of the color space that contains only those points of the color space, which are also part of the representation of the colors of the digital image in the color space. A printer gamut of a printing apparatus may be defined as the part of the color space that contains all of the colors that can be printed by the printing apparatus. The printer gamut is often smaller in size that the image gamut. This means that a point of the image gamut may be outside the printer gamut and cannot be printed according to the coordinates of that point. Normally, points of the image gamut of a first digital image are mapped on the points of the printer gamut in a particular way. This mapping results in a second digital image and the printing apparatus is able to print this second digital image.

It is recommended to implement a mapping from a first digital image to a second digital image, as described above, in such a way that at least one property of the pixels in the digital image is maintained; for example, if one wants to maintain a perceived lightness of the first digital image or local details of the first digital image. An algorithm for mapping digital images may be used in many of the currently available color management software, which may be implemented in a controller of a printing apparatus. Often, such an algorithm contains a mapping of a color space towards the same color space, which is decomposed into a scaling step in the directions of the three coordinate axes of the color space and an offset step. Such an algorithm scales the complete digital image gamut in three directions and normally takes into account the possible ranges of the coordinates in the printer gamut. Such an algorithm may take into account a deviating axis of a property of the printer gamut, e.g. a lightness axis. This results in a so-called black and white point correction algorithm. A printer displays color images in its unique way. A printer may be calibrated using look-up tables (LUTs) or with an ICC style color management, which relies on color profiles to ensure that images are reproduced and displayed accurately. Part of creating an LUT may be a black and white point correction.

A black and white point correction is an operation that matches perceived black (black point of the first image) to the darkest printer lightness and perceived white (white point of the first image) to the brightest printer lightness. It is critical for a pleasing reproduction of images. Black and white point correction may be automatically included in a gamut mapping algorithm or it may be performed as a pre- or post-processing step in addition to a gamut mapping.

Such a gamut mapping may be defined by using a solution of a optimization problem as, for example, disclosed in publication "Space sensitive color gamut mapping: A variational approach"/R. Kimmel, D, Shaked, M. Elad and I. Sobel (HP) or in publication "A framework for image-dependant gamut mapping", in Proc. SPIE, Color Imaging/J. Giesena, E. Schuberth, K. Simon, D. Zeiter and P. Zolliker (Gretag).

These publications define a gamut mapping as an outcome of a parameterized mathematical optimization problem that allows constraint of the degree to which objectives like contrast preservation, hue preservation, saturation preservation and the continuity of the mapping can be violated while maximizing the printer gamut exploitation. A disadvantage of the approach is that the optimization problem is defined over millions of pixels and therefore computationally rather expensive.

In a publication of N. Moroney (HP), "Local color correction using non-linear masking" in Proc. IS&T/SID Eighth Color Imaging Conference, a local contrast enhancement algorithm is described that is based on non-linear masking. The algorithm is equivalent to deriving a specific tone reproduction curve for each pixel in the image. The work focuses on image enhancement in total and comprises an estimation of a compression function per processed pixel, which is rather cumbersome.

A starting point for the method according to the present invention is that the lightness axis of the color space comprises the source white point, the source black point, the destination white point and the destination black point. The method comprises the steps of defining a composed transfer function which maps the source white point onto the destination white point and the source black point onto the destination black point, and applying the function on the lightness components of each source color. Such functions are known from the prior art, and may be visualized by a sigmoidal function or another continuous function.

SUMMARY OF THE INVENTION

The object of the present invention is to create an algorithm aimed at improving a black and white point correction of a digital image to be printed.

The object of the present invention is to create a less expensive algorithm aimed at improving a transfer of the lightness components of the colors of the image to be printed.

An object of the present invention is achieved by dividing the lightness axis between the source white point and the source black point into a plurality of pieces, defining for each piece a linear mapping from said piece to a part of the lightness components of the destination colors, said linear mapping having a steepness, the value of which has to be determined, defining the composed transfer function as a composed linear mapping consisting of the plurality of linear mappings, determining the steepness of each linear mapping of the composed transfer function by the steps of defining a first measure in the color space for the distance between the lightness component of a source color and the lightness component of a corresponding destination color, defining a second measure in the color space for the distance between a lightness contrast of neighboring source colors and a lightness contrast of corresponding neighboring destination colors, defining a first constraint for the steepnesses in order to establish that the mapped lightness components of the source colors lie on the lightness axis between the destination black point and the destination white point, and computing by means of mathematical optimization for said part of the image the values of the steepnesses of the pieces, wherein said optimization takes the first measure, the second measure and the first constraint into account.

Such a piece-wise linear composed function in a direction of the lightness axis of the color space is faster than the mappings of the prior art discussed above, which concern mappings on all coordinates of the color space. The piece-wise linear composed function is defined by a function applied to a lightness component of a source color and resulting in a lightness component of a destination color. Each linear piece has a projection on the axis of the lightness components of the source colors, which projection has a predetermined length. Each piece has also a steepness value of a collection of steepness values.

The collection of steepness values may be the outcome of a mathematical optimization problem. In mathematics and computer science, optimization, or mathematical programming, refers to choosing the best element from some set of available alternatives. In the simplest case, this means solving problems in which one seeks to minimize or maximize a real function by systematically choosing the values of real or integer variables from within an allowed set. This formulation, using a scalar, real-valued objective function, is probably the simplest example; the generalization of optimization theory and techniques to other formulations comprises a large area of applied mathematics. More generally, it means finding "best available" values of some objective function given a defined domain, including a variety of different types of objective functions and different types of domains. Quadratic programming is a special type of mathematical optimization problem. It is the problem of optimizing (minimizing or maximizing) a quadratic function of several variables subject to linear constraints on these variables. Quadratic programming allows the objective function to have quadratic terms, while the allowed set may be specified with linear equalities and inequalities. There are many software and hardware packages available that include quadratic programming solvers.

According to the present invention, a quadratic optimization problem is used, since distances play a role in the optimization problem. Instead of a quadratic optimization problem, absolute values of distances may be used, but squaring distances is preferred, since mathematical optimization hardware and/or software is tuned for linear and quadratic optimization problems. By using such hardware and/or software, the compression function is optimized for the specific image. The steepness values are optimized for preserving the lightness property such that the lightness of the destination colors remain within a range of, the lightness property within the printer gamut. From the background art, a sigmoid compression based algorithm is known. An advantage of a piece-wise linear composed transfer function is that such a function may approximate any arbitrary transfer function by taking a sufficient number of pieces. A goal is to calculate an optimal transfer function for each image with respect to observed image quality. In case of lightness in an L*a*b* color space, one can easily see that an optimal transfer function looks different for a dominantly dark image than for a dominantly light one. For dark images, an optimal transfer function should preserve details in dark colors, whereas light images require a transfer function preserving details in light colors. An advantage of a piece-wise linear transfer function is that the optimal steepnesses may be determined by solving a constrained optimization problem. The method computes the values of the steepness values by means of mathematical optimization for the part of the image. The part may be a segment of the image or the whole image. The optimization takes the first measure, the second measure and the first constraint into account. This is advantageous, since the method intends to preserve lightness by means of the first measure, to preserve contrast by means of the second measure and to avoid out-of-gamut problems regarding the lightness component of a destination color by means of the first constraint.

In an advantageous embodiment, the mathematical optimization is a minimization of an objective function under the condition of the first constraint, which objective function comprises a first term for lightness preservation, said first term comprising the first measure for each source color in the part of the image, and a second term for contrast preservation, said second term comprising the second measure for each source color in the part of the image. By defining the objective function, lightness of the part of the image is optimized and contrast of the part of the image is optimized and the lightness value of each destination color lies in the printer gamut.

In another embodiment of the present invention, the minimization of the objective function is constrained by a second constraint by which the absolute difference of each pair of subsequent steepness values ($\alpha i$, $\alpha i+1$) is smaller than or equal to a predetermined length ($\Delta L$) multiplied by a predetermined value ($\delta \alpha max$) of maximum change of steepness. The first constraint establishes that the lightness component of each source color is mapped to a lightness component lying in the range between the minimum lightness component of the destination colors and the maximum lightness component of the destination colors. By applying the second constraint to the optimization, a smooth transfer is established. A smooth transfer avoids sharp changes in the transfer function leading to contouring in transformed images.

In another embodiment of the present invention, the first term is proportional to a sum of a squared difference of the lightness component of each source color and the lightness component of the corresponding destination color. By taking the sum of a squared difference of the lightness component of each source color and the lightness component of the corresponding destination color, a measure for the lightness preservation is obtained. Since the objective function contains also another term, the term for lightness preservation has been made proportional to this sum by means of a hand-tuned weight of color reproduction. This weight determines the contribution of the term for lightness preservation to the objective function. Experiments have revealed a preferred value for this weight. Choosing quadratic terms for the objective function is advantageous, since many software and/or hardware implementations for optimization of such an objective function are available.

In another embodiment of the present invention, the second term is a quadratic term defined as being proportional to a sum over all source colors of a sum over all neighboring source colors of each source color of a squared difference between a difference of a lightness component of said source color and a lightness component of a neighboring source color and a difference of a lightness component of the corresponding destination color and a lightness component of the corresponding neighboring destination color. By taking the sum in this manner, a measure for contrast preservation is obtained. Since the objective function contains also a term for lightness preservation, the term for contrast preservation has been made proportional to this sum by means of a hand-tuned weight of contrast reproduction. This weight determines the contribution of the term for contrast preservation to the objective function. Experiments have revealed a preferred value for this weight. Choosing quadratic terms for the objective function is advantageous since many software and/or hardware implementations for optimization of such an objective function are available.

In another embodiment of the present invention, the first term is proportional to a sum of an absolute difference of the lightness component of each source color and the lightness component of the corresponding destination color. By taking the sum of an absolute difference of the lightness component of each source color and the lightness component of the corresponding destination color, a measure for the lightness preservation is obtained. Since the objective function contains also another term, the term for lightness preservation has been made proportional to this sum by means of a hand-tuned weight of color reproduction. This weight determines the contribution of the term for lightness preservation to the objective function. For the optimization of this kind of objective function, other software and/or hardware implementations may be necessary than in the case of an objective function with quadratic terms.

In another embodiment of the present invention, the second term is a term defined as being proportional to a sum over all source colors of a sum over all neighboring source colors of each source color of an absolute difference between a difference of a lightness component of said source color and a lightness component of a neighboring source color and a difference of a lightness component of the corresponding destination color and a lightness component of the corresponding neighboring destination color. By taking the sum in this manner a measure for contrast preservation is obtained. Since the objective function contains also a term for lightness preservation, the term for contrast preservation has been made proportional to this sum by means of a hand-tuned weight of contrast reproduction. This weight determines the contribution of the term for contrast preservation to the objective function. For the optimization of this kind of objective function, other software and/or hardware implementations may be necessary than in the case of an objective function with quadratic terms.

In another embodiment of the present invention, the composed transfer function is an adaptive global lightness compression applied to the whole image. The global compression function acts on each source color of the image. The use of only one compression function speeds up the calculations, which have to done in order to get the lightness values of the destination colors.

In another embodiment of the present invention, the composed transfer function is an adaptive local lightness compression, comprising a plurality of local compression functions, each of which is defined by carrying out a global lightness compression function on a segment of the image, wherein the segments overlap and each local compression function acts only on lightness components of source colors in a middle of the corresponding segment, and a corresponding objective function of each local compression function comprises a third term for a smooth transition of corresponding steepness values between neighboring segments. This embodiment may improve the method in the previous embodiment in preserving fine local details in light colors in a dominantly dark image or in dark colors in a dominantly light image. This embodiment calculates many local compression functions instead of a global one. A local compression function may be calculated by carrying out the global optimization on a segment of the image. This segment is called a sliding adaptation window since pixels in this window are used to adapt the compression function. Once the compression function is determined, pixels undergo the locally optimal lightness adaptation. Only pixels in the very middle of the adaptation window are transformed rather than transforming all pixels of the adaptation window. This is advantageous since this strategy enables overlapping adaptation windows. Overlaps ensure moderate changes between neighboring compression functions leading to less visible blocking artifacts in the printed image.

In another embodiment of the present invention, the third term is proportional to a sum of a sum of squared differences of steepness values of segments neighboring in a horizontal direction of the image and a sum of squared differences of steepness values of segments neighboring in a vertical direction. This additional term gives extra control over differences between neighboring compression functions. The term minimizes the difference between a current and the neighboring compression functions. In an embodiment, the left and upper neighboring compression functions are used. This is advantageous when these left and upper neighboring compression functions are already calculated beforehand. The term is made proportional to the objective function by means of a hand-tuned weight. Increasing this weight may ensure slight changes between neighboring compression functions and makes blocking artifacts disappear. On the other hand, increasing this weight leads to less preserved lightness and contrast. Experiments have revealed applicable values for this weight.

In another embodiment of the present invention, the third term is proportional to a sum of a sum of absolute differences of steepness values of segments neighboring in a horizontal direction of the image and a sum of absolute differences of steepness values of segments neighboring in a vertical direction. This additional term gives extra control over differences between neighboring compression functions. The term minimizes the difference between a current and the neighboring compression functions. In an embodiment, the left and upper neighboring compression functions are used. This is advantageous when these left and upper neighboring compression functions are already calculated beforehand. The term is made proportional to the objective function by means of a hand-tuned weight. Increasing this weight may ensure slight changes between neighboring compression functions and makes blocking artifacts disappear. On the other hand, increasing this weight leads to less preserved lightness and contrast.

In another embodiment of the present invention, the composed transfer function also comprises a translation and a rotation before the application of the composed linear mapping. The translation and the rotation may be advantageous, when a lightness axis of the color space does not correspond to the lightness axis of the printer gamut. The translation and the rotation are determined in such a way that after the translation and the rotation, the translated and rotated lightness axis of the color space coincides with the lightness axis of the printer gamut.

The present invention further relates to a printing apparatus for processing a digital image, comprising a control unit, which is adapted to perform the method according to any of the embodiments described above. By using this method, when the printing apparatus is processing an image, a lightness range of the image gamut, as well as a lightness range of the printer gamut corresponding to the printing apparatus, are taken into account.

The present invention further relates to a program stored in a non-transitory computer-readable medium for processing a digital image, said program including instructions for a computer to execute the method according to any of the embodiments described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
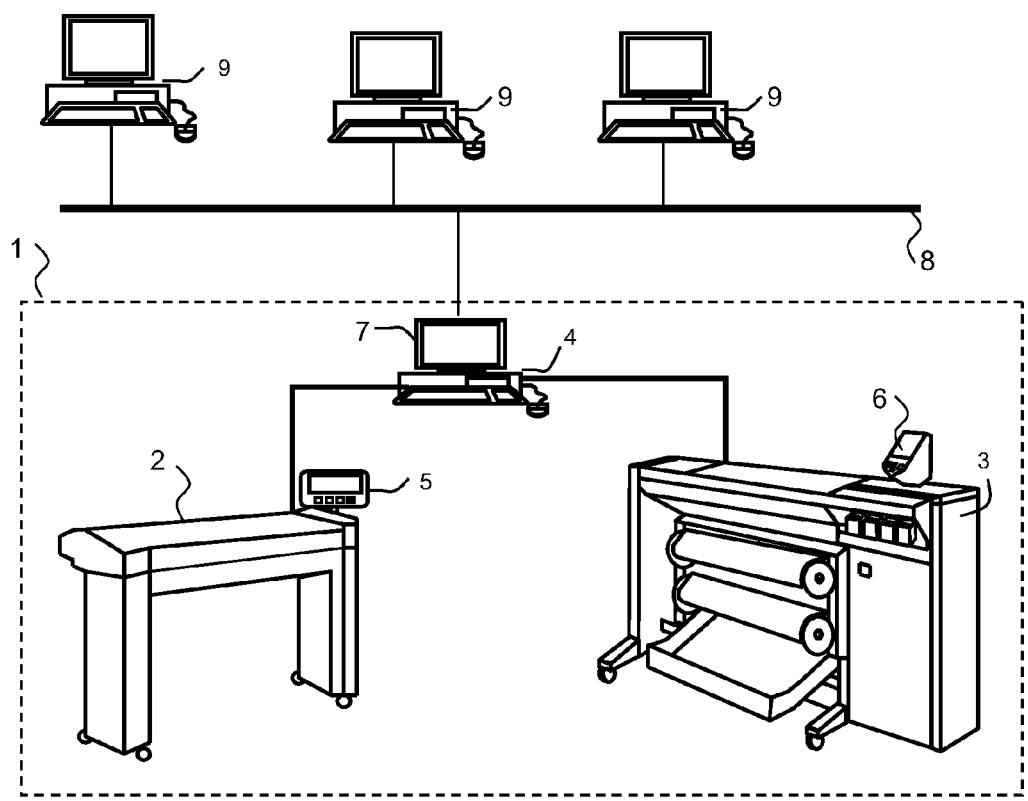
FIG. 1 is a schematic diagram of an environment in which the present invention may be used.

The present invention will now be described with reference to the accompanying drawings, wherein the same or similar elements are identified with the same reference numeral.

FIG. 1 is a schematic diagram of an environment in which the present invention may be used. The reprographic system 1, as presented here comprises a scanning unit 2, a printing unit 3 and a control unit 4.

The scanning unit 2 is provided for scanning an original color document supported on a support material. The scanning unit is provided with a CCD type color image sensor (i.e. a photoelectric conversion device), which converts the reflected light into electric signals corresponding to the primary colors red (R), green (G) and blue (B). A local user interface panel 5 is provided for starting scan and copy operations.

The printing unit 3 is provided for printing digital images on image supports. The printing unit may use any number of printing techniques. It may be a thermal or piezoelectric inkjet printer, a pen plotter, a press system based on a direct imaging process technology or a press system based on organic photoconductor technology, for instance. In the example shown in FIG. 1, printing is achieved using a wide format inkjet printer provided with four different basic inks, such as cyan, magenta, yellow and black. The housing contains a printhead, which is mounted on a carriage for printing swaths of images. The images are printed on an ink receiving medium such as a sheet of paper supplied by a paper roll. A local user interface panel 6 is provided with an input device such as buttons for selecting a user, a job and starting a printing operation, etc.

The scanning unit 2 and the printing unit 3 are both connected to a control unit 4. The control unit 4 executes various tasks such as receiving input data from the scanning unit 2, handling and scheduling data files, which are submitted via a network 8, controlling the scanning unit 2 and the printing unit 3, converting image data into printable data, etc. The control unit is provided with a user interface panel 7 for offering the operator an extensive menu of commands for executing tasks and making settings.

Moreover, the control unit is connected to the network 8, so that a number of client computers 9, also connected to the network, may make use of the reprographic system 1.

Figure 2:
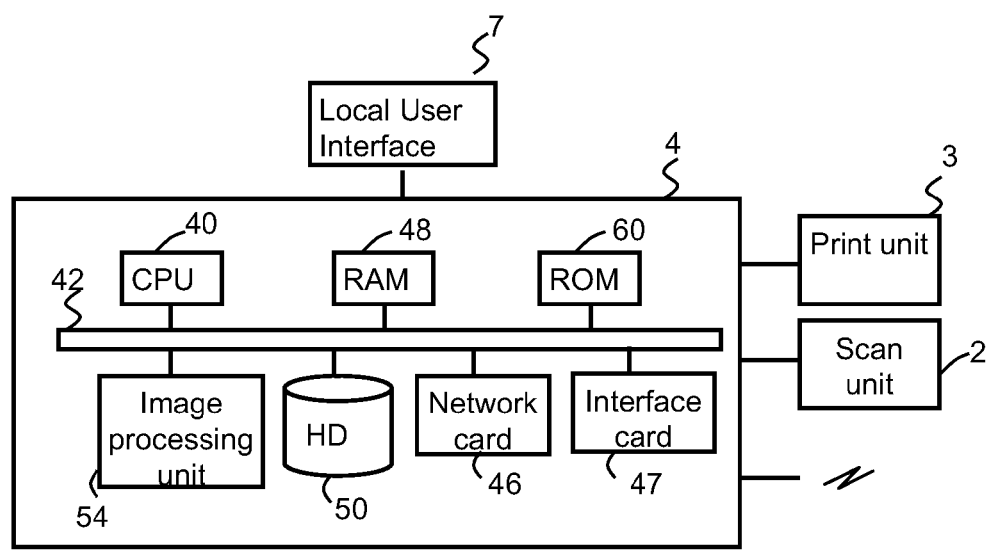
FIG. 2 is a schematic diagram of a control unit of a reprographic system according to FIG. 1.

The control unit is in more detail presented in FIG. 2. As shown in FIG. 2, the control unit 4 of the reprographic system 1 comprises a Central Processing Unit (CPU) 40, a Random Access Memory (RAM) 48, a Read Only Memory (ROM) 60, a network card 46, an interface card 47, a hard disk (HD) 50 and an image processing unit 54 (such as a Raster Image Processor or RIP). The aforementioned units are interconnected through a bus system 42.

The CPU 40 controls the respective units of the control unit 4, the local user interface 7, in accordance with control programs stored on the ROM 60 or on the HD 50. The CPU 40 also controls the image processing unit 54.

The ROM 60 stores programs and data such as boot program, set-up program, various set-up data or the like, which are to be read out and executed by the CPU 40.

The hard disk 50 is an example of a storage unit for storing and saving programs and data, which make the CPU 40 execute a print process to be described later. The hard disk 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area that is used by the CPU 40 to execute various processes.

Interface card 47 connects the control unit to scanning unit 2 and printing unit 3. Network card 46 connects the control unit 4 to the network 8 and is designed to provide communication with the workstations 9, and with other devices reachable via the network.

The image processing unit 54 may be implemented either as a software component of an operating system running on the control unit 4 or as a firmware program embodied in an FPGLA. The image processing unit 54 has functions for reading, interpreting and rasterizing the print job data. The print job data contains image data to be printed (i.e. fonts and graphics that describe the content of the document to be printed, described in a Page Description Language or the like), image processing attributes and print settings. In an advantageous embodiment, the image processing unit 54 carries out the method according to the present invention. Basic modes of operation for the reprographic system are scanning, copying and printing.

With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color that the pixel should be displayed in. The representation of an image may have each pixel specified by three 8 bit (24 bits total) colorimetric values (ranging from 0-255) defining the amount of R, G, and B, respectively in each pixel. In the right proportions, R, G, and B can be combined to form black, white, 254 shades of grey, and a vast array of colors (about 16 million). Alternatively, the colors of the pixels of the digital image may be expressed in another color space such as Lab, L*a*b* or XYZ.

The digital image obtained by the scanning unit 2 may be stored on a memory of the control unit 4 and be handled according to a copy path, wherein the image is printed by the print engine 3. Alternatively, the digital image may be transferred from the controller to a client computer 9 (scan-to-file path). Finally, a user of the client computer 9 may decide to print a digital image, which reflects the printing mode of operation of the system.

Figure 3A:
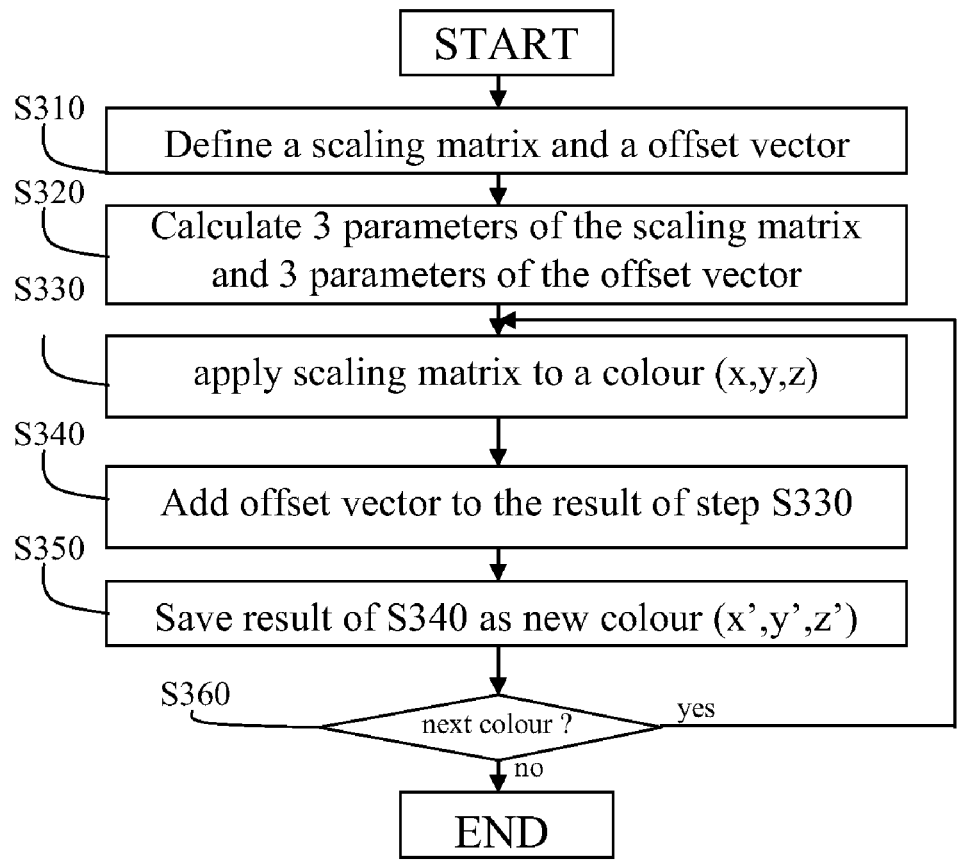
FIG. 3a is a flow diagram of the method from the background art describing a black and white point correction.

FIG. 3*a* shows a flow diagram of a method from the background art. In a first step S310, a scaling matrix and an offset vector are defined. In a second step S320, three parameters Sx, Sy, Sz of the scaling matrix and three parameters Ox, Oy, Oz of the offset vector are calculated, by means of the condition that a source black point is mapped to the destination black point and a source white point is mapped to the destination white point. In a third step S330, for each color (X, Y, Z) in the image, the scaling matrix is applied to this color (X, Y, Z). In a fourth step S340, the offset vector (Ox, Oy, Oz) is added to the result of the third step S330. In a fifth step S350, the result of the fourth step S340 is saved as a destination color (X',Y',Z'). In a last step S360, it is checked if there are any colors left to be processed. If so, the procedure returns to the third step S330 with the next color. If not, the procedure ends. The disadvantages of this method have been made clear above in the description.

In the following examples of embodiments, a color space L*a*b* is used to demonstrate the present invention. In such a color space, the L*-component of a color represents the lightness property of the color and the a*b*-components represent the chroma of the color. A person skilled in the art may understand that the examples may be accordingly adapted for application in a color space other than the L*a*b* color space, as far as the lightness property is representable in such a color space, for example by a line in such a color space.

Figure 3B:
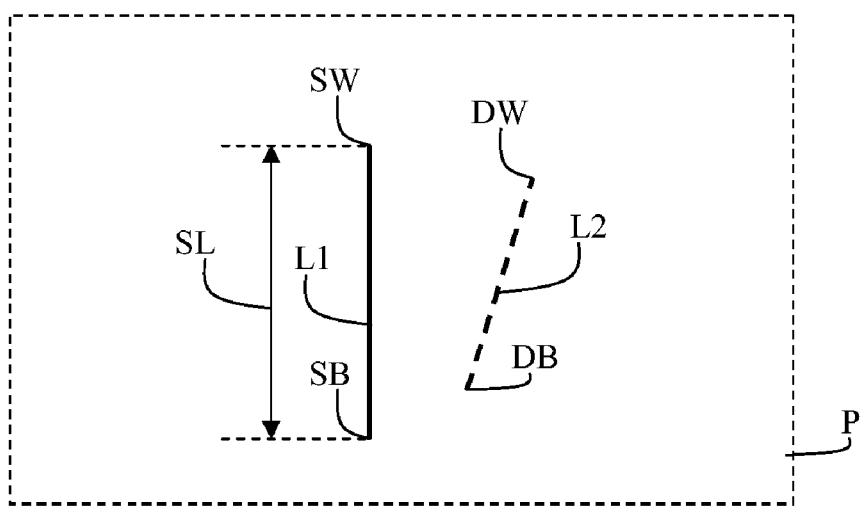
FIG. 3b illustrates schematically a part of a color space comprising two lightness axes.

As shown in FIG. 3*b*, a part P of a color space is shown comprising a first lightness axis L1 containing extreme points SW, SB of a color space in which the image is represented and a second lightness axis L2 containing extreme points DW, DB of a printer gamut. A first extreme point SW on the first lightness axis L1 may be called a source white point. A second extreme point SB on the first lightness axis L1 may be called a source black point. A first extreme point DW on the second lightness axis L2 may be called a destination white point. A second extreme point DB on the second lightness axis L2 may be called a destination black point. The goal of a mapping from the source colors of the image to output colors in the same color space is to map the source white point SW onto the destination white point DW and the source black point SB onto the destination black point DB. In general, the mapping does not only map the mentioned source colors SW, SB onto the mentioned destination colors DW, DB, but acts on all colors in the image gamut. Usually, the distance between the extreme points DW, DB on the second lightness axis L2 is approximately smaller than the distance between the extreme points SW, SB on the first lightness axis L1. Therefore, the mapping performs a compression of the lightness range to a percentage lower than 100% of the source length SL, defined as the distance between the source white point SW and the source black point SB.

In contrast with the before-mentioned scale-and-offset algorithm, the transformation according to an embodiment of the present invention is reconsidered from the point of view of preserving local detail visibility. Therefore, an algorithm has been designed that operates in the perceptually linear L*a*b* color space:

$$\text{Lab}_{src\text{-}black} \Rightarrow \text{Lab}_{dest\text{-}black} \qquad (4)$$

$$\text{Lab}_{src\text{-}white} \Rightarrow \text{Lab}_{dest\text{-}white} \qquad (5)$$

Figure 4:
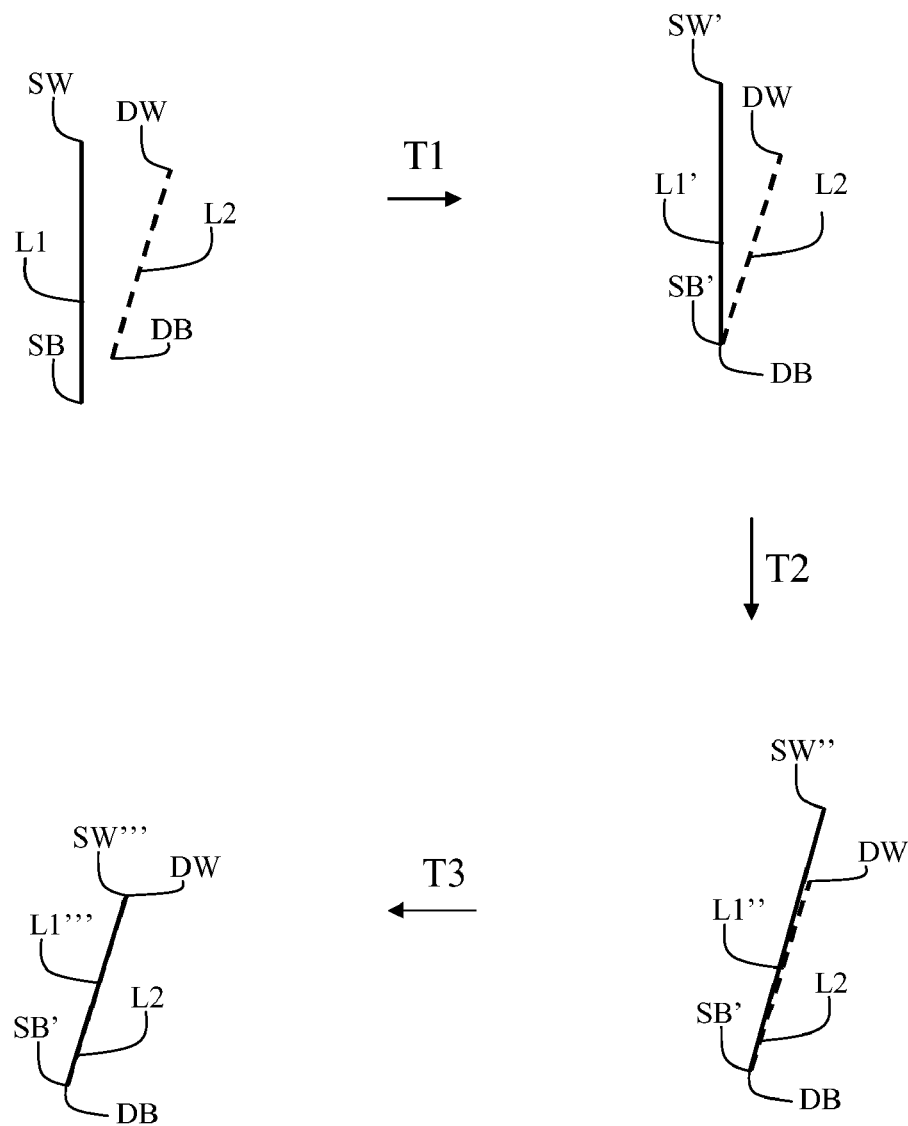
FIG. 4 illustrates schematically three transformation steps T1, T2, T3.

In the previously described scale-and-offset algorithm, a transformation is decomposed into a scaling step and an offset step. According to a preferred embodiment of the present invention, a method comprising another possible decomposition than the scaling step and the offset step is chosen. The method avoids scaling in all color space dimensions. This decomposition comprises three steps, which are illustrated in FIG. 4: an offset step T1 that maps the source black point SB to the destination black point DB resulting in a mapped source black point SB' and a mapped source white point SW'; a rotation step T2 that maps the direction of the line defined by the mapped source white point SW' and the mapped source black point SB' onto the direction of the line defined by the destination white point DW and the destination black point DB resulting in a rotated mapped source white point SW''; and a compression step T3 that maps the rotated mapped source white point SW'' onto the destination white point DW resulting in a compressed rotated mapped source white point SW'''.

The decomposition starts with an offset step T1 similar to the previously described known method. In the second step T2, a rotation matrix is applied mapping the direction of the source lightness axis L1 onto the destination lightness axis L2. It should be noted that rotation matrices have unity eigenvalues, and therefore, do not change distance between color points. Hence, distances between color points remained unchanged so far. Only in the last step T3, a compression is performed along the aligned lightness axes, being the rotated mapped source lightness axis L1" and the destination lightness axis L2. An advantage of compressing in a single direction is that color distances measured on planes orthogonal to the destination lightness axis L2 remain unchanged. In comparison with the previously known scaling-and-offset algorithm, compression is applied in this case only in a single direction, rather than in three color directions to the same extent (approximately 20%). When implementing the third step T3 in a software program executed by the control unit of the reprographic system, a remarkable reduction of calculation times may be achieved.

The steps T1 and T2 may be visualized by a formula like:

$$\begin{pmatrix} L' \\ a' \\ b' \end{pmatrix} = Mrot * \begin{pmatrix} L + Ox - DBL \\ a + Oy - DBa \\ b + Oz - DBb \end{pmatrix} + \begin{pmatrix} DBL \\ DBa \\ DBb \end{pmatrix}$$

and $$Mrot =$$

$$\begin{pmatrix} \cos(\alpha) & -\sin(\alpha) & 0 \\ \sin(\alpha) & \cos(\alpha) & 0 \\ 0 & 0 & 1 \end{pmatrix} \begin{pmatrix} \cos(-\beta) & 0 & \sin(-\beta) \\ 0 & 1 & 0 \\ -\sin(-\beta) & 0 & \cos(-\beta) \end{pmatrix} \begin{pmatrix} \cos(-\alpha) & -\sin(-\alpha) & 0 \\ \sin(-\alpha) & \cos(-\alpha) & 0 \\ 0 & 0 & 1 \end{pmatrix}$$

wherein α is an angle in the a*b*-plane between the projection of the vector (DWL−DBL, DWa−DBa, DWb−DBb), wherein (DBL, DBa, DBb) and (DWL, DWa, DWb) are the L*a*b*-coordinates of the respective destination black point and the destination white point, and the a*-axis, β is the angle between the vector (DWL−DBL, DWa−DBa, DWb−DBb) and the L*-axis, and (Ox, Oy, Oz) is the offset vector of the offset step T1.

In another embodiment, the first two steps T1, T2 are exchanged. First, a rotation step is applied and then an offset step is applied. The rotation angle belonging to the rotation step is determined as being an angle between two crossing lines in a three-dimensional space, which is the angle between two lines parallel to the original lines, which two lines lie in a same plane (and thus always intersect each other).

Figure 5:
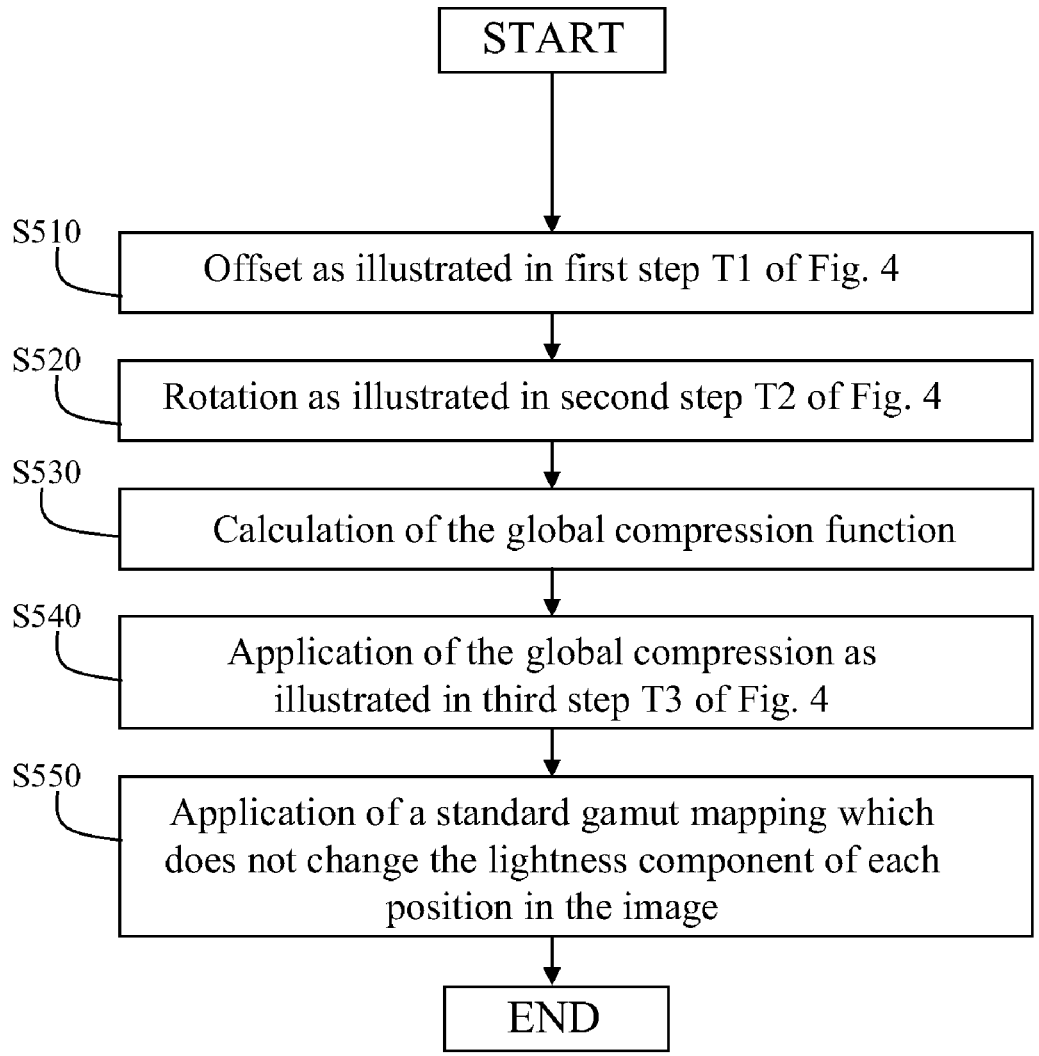
FIG. 5 is a flow diagram describing the transformation comprising a global optimal compression step according to an embodiment of the present invention.

The method is made up of the following steps as shown in FIG. 5. In a first step S510, an offset as illustrated in the first step T1 in FIG. 4 is applied to the image. In a second step S520, a rotation as illustrated in the second step T2 in FIG. 4 is applied to the result of the first step. In a third step S530, a global optimal compression function is calculated for the image resulting from the second step. The global optimal compression function may be obtained by the solution of the quadratic optimization problem according to the embodiment described before. In a fourth step S540, the global optimal compression function is applied as illustrated in the third step T3 of FIG. 4. A last step S550 is the application of a gamut mapping to the result of the fourth step, which gamut mapping only changes the chroma components a*b* of the color and leaves the lightness component L* unchanged. Examples of such a gamut mapping is described in the article titled "Gamut mapping: Evaluation of Chroma Clipping Techniques for Three Destination Gamuts" written by Ethan D. Montag, Mark D. Fairchild and Chester F. Carlson. By doing so, the result is an image with colors lying within or on a surface of the printer gamut.

Figure 6A:
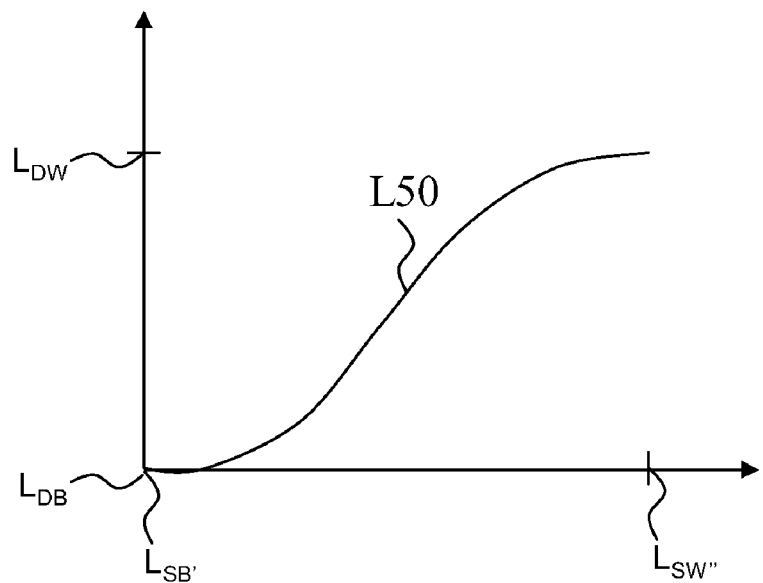
FIG. 6a illustrates a sigmoidal compression function according to the background art.

The compression in the third step T3 of FIG. 4 will now be further elucidated. The compression in the third step T3 of FIG. 4 may be visualized in the form of a compression function. FIG. 6a shows an example of a known sigmoid compression function, which may be used for this purpose. A horizontal axis represents lightness values along the mapped rotated source lightness axis L1" and a vertical axis represents lightness values along the destination lightness axis L2. Such a sigmoid compression function decreases a local difference between dark color pairs and a local difference between light color pairs. However, such a sigmoid compression function preserves or even enhances local contrast of color pairs close to a 50% lightness point L50. The extent of contrast enhancement depends on the steepness of the sigmoid at the 50% lightness point. The steepness may be varied inside an interval [0 . . . ∞]. It should be noted that as the steepness decreases, the sigmoid function turns via a linear function into a logit function.

All source colors of the image may undergo the above described three steps T1, T2, T3. The compression function is the same for all source colors; therefore, this transformation depends only on the source color space and the printer gamut. Nevertheless, when comparing images processed by this method and the known method described before as scaling and offset in a XYZ color space, a visible increase in local detail visibility may be observed.

In a next embodiment of the present invention the previous embodiment is further improved by means of an image dependent black-white adaptation algorithm. From the background art, image dependent color management algorithms are known, which analyze the content of each image by means of color distribution, space filtering, etc. The extracted content is used during lightness compression and gamut mapping for adapting color management algorithms.

A black-white adaptation algorithm is an algorithm for mapping from the source colors of the image to output colors. To the output colors belong, amongst others, the destination white point and the destination black point. Such an algorithm maps the source white point to the destination white point and the source black point to the destination black point.

In the following, a black-white adaptation algorithm is presented, which makes use of parameters optimized for each individual image. Optimization is based on perceptual objectives such a color fidelity and local detail visibility.

Figure 6B:
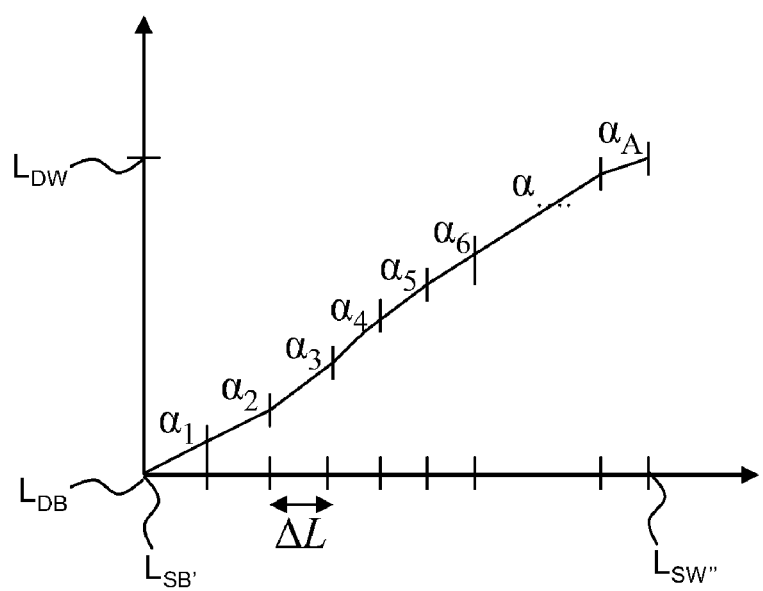
FIG. 6b illustrates a piecewise linear compression function according to an embodiment of the present invention.

In another embodiment of the present invention, the sigmoid compression based algorithm described above is changed by replacing the sigmoid function by an adaptive compression function. To this end, a piecewise linear compression function is used in the third step T3 of the method described in the previous embodiment. A schematic view of such a compression function is shown in FIG. 6b.

Taking a sufficient number A of pieces with respective steepness $\alpha_1, \alpha_2, \alpha_3, \ldots \alpha_A$ and each of the pieces having a projective length ΔL on the horizontal axis, this function can approximate any arbitrary compression function. An i-th parameter $\alpha_i$ defines the steepness (gradient) of an i-th piece (i varying from 1 to A) and the length ΔL depends on the number A of pieces.

Figure 6C:
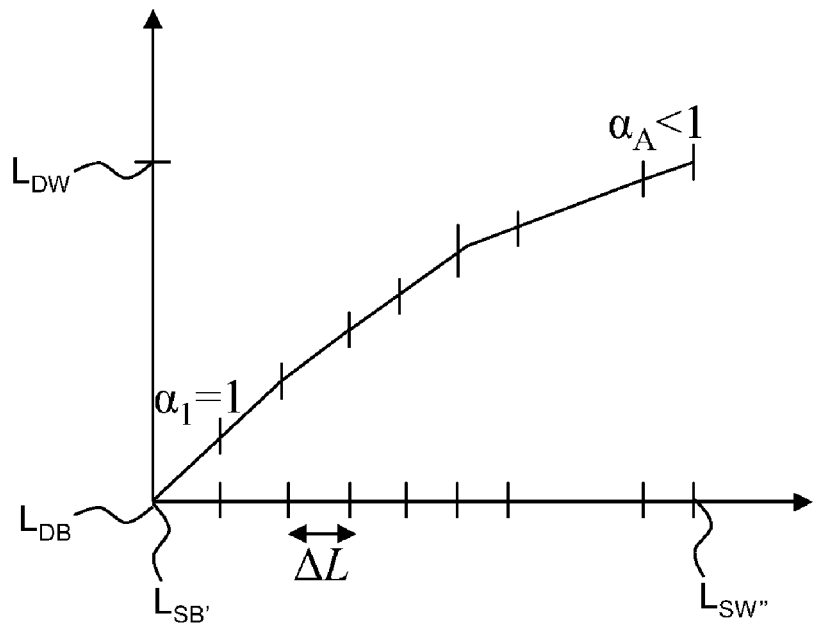
FIG. 6c illustrates a piecewise linear compression function suited for a dominantly dark image.
Figure 6D:
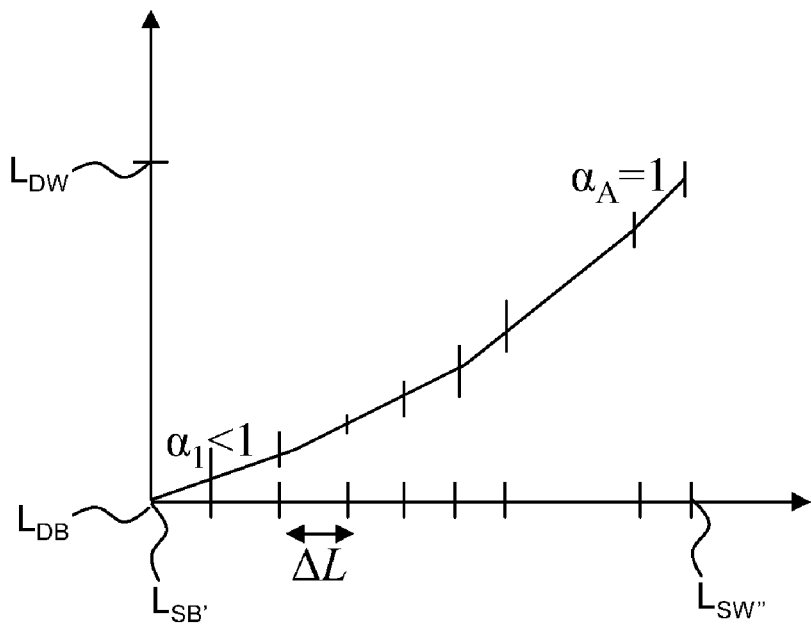
FIG. 6d illustrates a piecewise linear compression function suited for a dominantly light image.

The goal is to calculate an optimal compression function for each image with respect to observed image quality. An optimal compression function looks different for a dominantly dark image than for a dominantly light image. For a dominantly dark image, as shown in FIG. 6c, an optimal compression function should preserve details in dark colors, whereas a dominantly light image, as shown in FIG. 6d, requires an optimal compression function preserving details in light colors. For a dominant dark image, the steepness values $\alpha_1, \alpha_2, \alpha, \ldots \alpha_A$ are starting with $\alpha_A=1$ and ending with $\alpha_A<1$. For a dominant light image the steepness values $\alpha_1, \alpha_2,$ $\alpha_3, \ldots \alpha_A$ are starting with $\alpha_1 < 1$ and ending with $\alpha_A = 1$. In order to establish optimal steepness values for an image, the following quadratic optimization problem is defined. The optimization problem consists of minimizing an objective function O over the vector $\alpha_1^A = (\alpha_1, \alpha_2, \alpha_3, \ldots \alpha_A)$, and in the mean while satisfying two constraints C1, C2:

$$O: w_l \sum_{ij \in I} [L_{ij} - L'_{ij}(\alpha_1^A)]^2 +$$

$$w_c \sum_{ij \in I} \sum_{kl \in Neigh(ij)} [(L_{ij} - L_{kl}) - (L'_{ij}(\alpha_1^A) - L'_{kl}(\alpha_1^A))]^2$$

$$C1: \Delta L \sum_{a=1}^{A} \alpha_a = (L_{dest\text{-}white} - L_{dest\text{-}black})$$

$$C2: |\alpha_a - \alpha_{a-1}| \leq \Delta L \cdot \partial \alpha_{max}$$

$$a = 2, \ldots, A$$

wherein the following symbols are used:
$\alpha_1^A$: steepness vector of steepnesses $\alpha_1, \alpha_2, \alpha_3, \ldots \alpha_A$ of the compression function;
I: image consisting of colors on position coordinates ij;
$L_{ij}$: original lightness value on position ij;
$L'_{ij}(\alpha_1^A)$: compressed lightness value on position ij;
Neigh(ij): set of neighboring positions around ij, preferably the positions surrounding the position ij, preferably the eight positions with coordinates (i−1, j−1), (i−1, j), (i−1, j+1), (i, j−1), (i, j+1), (i+1, j−1), (i+1, j) and (i+1, j+1);
$w_l$: hand-tuned weight of color reproduction. This weight determines the contribution of the first summand to the objective function O;
$w_c$: hand-tuned weight of contrast reproduction. This weight determines the contribution of the second summand to the objective function O;
$(L_{dest\text{-}white} - L_{dest\text{-}black})$: length of destination lightness axis L2; and
$\delta\alpha_{max}$: predetermined maximum value of change in steepness.

The objective function O is an addition of two summands. The first summand of the objective function O is intended to preserve lightness. The second summand of the objective function O is intended to preserve contrast. The first constraint C1 ensures that the compressed lightness values are lightness values reproducible by the printer within the printer gamut. The second constraint C2 ensures that the compression is a smooth compression with a maximum change $\delta\alpha_{max}$ of steepness among the steepnesses $\alpha_1, \alpha_2, \alpha_3, \ldots \alpha_A$ of the compression function.

Hence, the optimal steepness vector $\alpha_1^A$ is determined by solving a constrained quadratic optimization problem. The optimum criterion of the objective function is perceptually motivated in the following senses:
underlying color space L*a*b* is perceptually linear;
the first summand of the objective function O preserves lightness values observed in the image; and
the second summand of the objective function O preserves local details observed in the image.

The optimization problem is constrained by the first constraint C1 forcing the compression function to map all possible source lightness values onto valid destination lightness values. Furthermore, a second smoothing constraint C2 is also used to avoid sharp changes in the compression function leading to contouring in transformed images. Standard quadratic programming libraries may be used to solve this optimization. After preparing input data structures, a chosen mathematical library may carry out an iterative search process. A result of such a process is a sequence of steepness values $\alpha_1, \alpha_2, \alpha_3, \ldots \alpha_A$ optimal for the given input image.

In summary, this adaptive black-white adaptation algorithm applies a perceptually optimal compression function to each individual image.

Good results are achieved in experiments by the inventor with the following values for the parameters:
A: number of pieces approximately 100;
Neigh: neighborhood window size of 3×3 of positions of colors. For example, 8 colors positioned around a target color position (i, j) having the coordinates (i−1, j−1), (i−1, j), (i−1, j+1), (i, j−1), (i, j+1), (i+1, j−1), (i+1, j) and (i+1, j+1) and the target color position (i, j) itself;
$w_l$: hand-tuned weight of color reproduction, approximately 0.2. This weight determines the contribution of the first summand to the objective function O;
$w_c$: hand-tuned weight of contrast reproduction, approximately 1.0. This weight determines the contribution of the second summand to the objective function O;
$\delta\alpha_{max}$: predetermined maximum value of change in steepness, approximately 0.02. This constant may be dependent on the maximum absolute second derivative of the compression function. The constant may be approximately 0 to let the steepness of the compression function hardly change, the constant may be much larger than 0 to let the steepness of the compression function freely change and the constant may be −1 to let this constant be inactive.

The global optimal compression method performs on average significantly better than device dependent algorithms. Nevertheless, a single compression function is an outcome of a global optimization in which most frequent colors play a dominant role. So it can happen that fine local details in light colors are less preserved in a dominantly dark image.

In another embodiment of the present invention many local compression functions are calculated instead of one global compression function. In this way the method according to the previous embodiment is improved.

Figure 7:
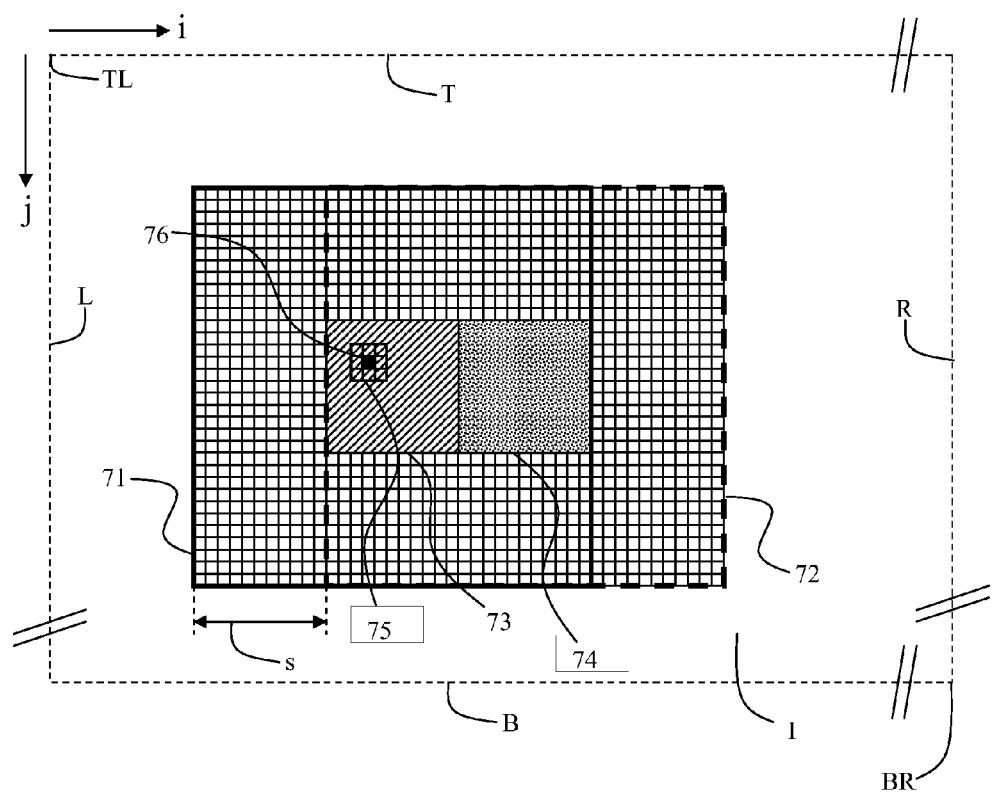
FIG. 7 is a representation of an image in which local optimal compression is explained.

FIG. 7 shows an image I in which local optimal compressions are calculated and used. The image I is completely divided in overlapping segments 71, 72. A local compression function may be calculated by carrying out the global optimization described in the previous embodiment on each segment 71, 72 of the image I. Such a segment 71 may be defined as a dense rectangle of positions with sides a×b, a and b being natural numbers both greater than or equal to 3. Preferably, the dense rectangle 71 equals a dense square (a=b). Hereinafter, the dense rectangle is assumed to be a dense square. A so-called sliding adaptation window is moved in a number of movements over the image I from the top-left corner TL of the image to the bottom-right corner BR of the image I. The dimensions of the adaptation window equal the dimensions of a segment 71, 72, in other words, a×b. The movements of the adaptation window over the image I are performed in such a way that each segments 71, 72 of the image I is once covered in a complete overlap. Colors in the segment covered by the adaptation window are used for determining the local compression function. Once the local compression function is determined, a part of the colors in the covered segment undergo a locally optimal black-white adaptation. In FIG. 7, the situation is shown wherein the adaptation window covers the segment 71. Only colors in a core 73 of the segment 71 are transformed rather than transforming all colors of the segment 71. This strategy enables overlapping segments, for example the segment 71 and the dashed segment 72. An overlap between two segments ensures moderate changes between neighboring compression functions leading to less visible blocking artifacts. The size s of the overlap determines also the size of the core 73. In FIG. 7, the segment size equals 33×33 positions, while the overlap size s equals 11 positions. The size of the core 73 equals 11×11 positions. For each position 76 with coordinates (i, j) in the segment 71, a neighborhood 75 has been defined, consisting of preferably eight pixels surrounding the position 76.

The sliding of the window over the image I starts with positioning the sliding adaptation window in a top left corner TL of the image I. Calculations are performed, which are described below, and the window is shifted over a distance s from a left side L of the image I to a right side R of the image I. For the colors in the segment covered by the window in the new position, the same calculations are performed. In this way, a first row of segments is worked up until the right side R of the image I is reached. When the sliding window reaches the right side R of the image I, the window is shifted to the left side L of the image I and then shifted towards the bottom side B of the image I over a distance s in a next row in the image I below the first row of segments which was just worked up. By shifting the sliding window from the top-left corner TL of the image I to the bottom-right corner BR of the image I in the indicated way, all positions (i, j) of the image I are worked up by calculations.

It may be clear for the skilled person that the sliding may also be performed column by column instead of row by row.

According to this embodiment an objective function O' and two constraints C1', C2' are used. Since the optimization is now carried out on segments of image I, a segment $S^{u,v}$ is mentioned in the objective function O', which segment has a central position (u,v). The adaptation window is moved by a number s of positions as explained above.

In order to establish optimal steepness values for a segment S of the image I, the following quadratic optimization problem is defined. The optimization problem consists of minimizing an objective function O' over the vector $\alpha_{1...A}^{u,v} = (\alpha_1^{u,v}, \alpha_2^{u,v}, \alpha_3^{u,v}, \ldots \alpha_A^{u,v})$ and in the mean while satisfying two constraints C1', C2':

$$O': w_l \sum_{ij \in S}[L_{ij} - L'_{ij}(\alpha_{1...A}^{u,v})]^2 +$$

$$w_c \sum_{ij \in S^{u,v}} \sum_{kl \in Neigh(ij)} [(L_{ij} - L_{kl}) - (L'_{ij}(\alpha_{1...A}^{u,v}) - L'_{kl}(\alpha_{1...A}^{u,v}))]^2 +$$

$$w_t \sum_{a=1}^{A}(\alpha_a^{u,v} - \alpha_a^{u-s,v})^2 + (\alpha_a - \alpha_a^{u,v-s})^2$$

$$C1': \Delta L \sum_{a=1}^{A} \alpha_a^{u,v} = (L_{dest\text{-}white} - L_{dest\text{-}black})$$

$$C2': |\alpha_a^{u,v} - \alpha_{a-1}^{u,v}| \leq \Delta L \cdot \partial \alpha_{max}$$

$$a = 2, \ldots, A$$

wherein the following symbols are used:
- $S^{u,v}$: adaptation window with a central position (u,v). The central position (u,v) is the position in the middle of the adaptation window. Therefore, the size of a side of the adaptation window is preferably an odd number of positions;
- s: shift value of adaptation window in both horizontal and vertical direction;
- $\alpha_{1...A}^{u,v}$: steepness vector of steepnesses $\alpha_1, \alpha_2, \alpha_3, \ldots \alpha_A$ of the compression function for the segment $S_{u,v}$;
- $L_{ij}$: original lightness value on position ij;
- $L_{ij}^{c}(\alpha_{1...A}^{u,v})$: compressed lightness value on position ij;
- Neigh(ij): set of neighboring positions around ij. This may be preferably a set of eight surrounding positions as explained in the previous embodiment;
- $w_l$: hand-tuned weight of color reproduction. This weight determines the contribution of the first summand to the objective function O';
- $w_c$: hand-tuned weight of contrast reproduction. This weight determines the contribution of the second summand to the objective function O';
- $w_t$: hand-tuned weight of transition smoothness. This weight determines the contribution of the third summand to the objective function O';
- $(L_{dest\text{-}white} - L_{dest\text{-}black})$: length of destination lightness axis L2; and
- $\delta\alpha_{max}$: predetermined maximum value of change in steepness.

The objective function O' is an addition of three summands. The first summand of the objective function O' preserves lightness. The second summand of the objective function O' preserves contrast. The third summand of the objective function O' preserves a smooth transition between neighboring local compression functions. For the sake of simplicity, only the a values of compression functions which have a core directly left of the current core and directly above the current core, which a values are already calculated, are taken into account. This may be extended to a values of more neighboring local compression functions, which are already calculated. Increasing a hand-tuned weight of transition smoothness w, ensures slight changes between neighboring compression functions. It makes blocking artifacts disappear but leads to less preserved lightness and local contrast. A good balance between the hand-tuned weights $w_l$, $w_c$, $w_t$ has been found by the inventor with values as indicated below.

The first constraint C1' takes care of that the compressed lightness values are lightness values reproducible by the printer within the printer gamut. The second constraint C2' takes care of that the compression is a smooth compression with a maximum change $\delta\alpha_{max}$ of steepness among the steepnesses $\alpha_1, \alpha_2, \alpha_3, \ldots \alpha_A$ of the compression function.

Figure 8:
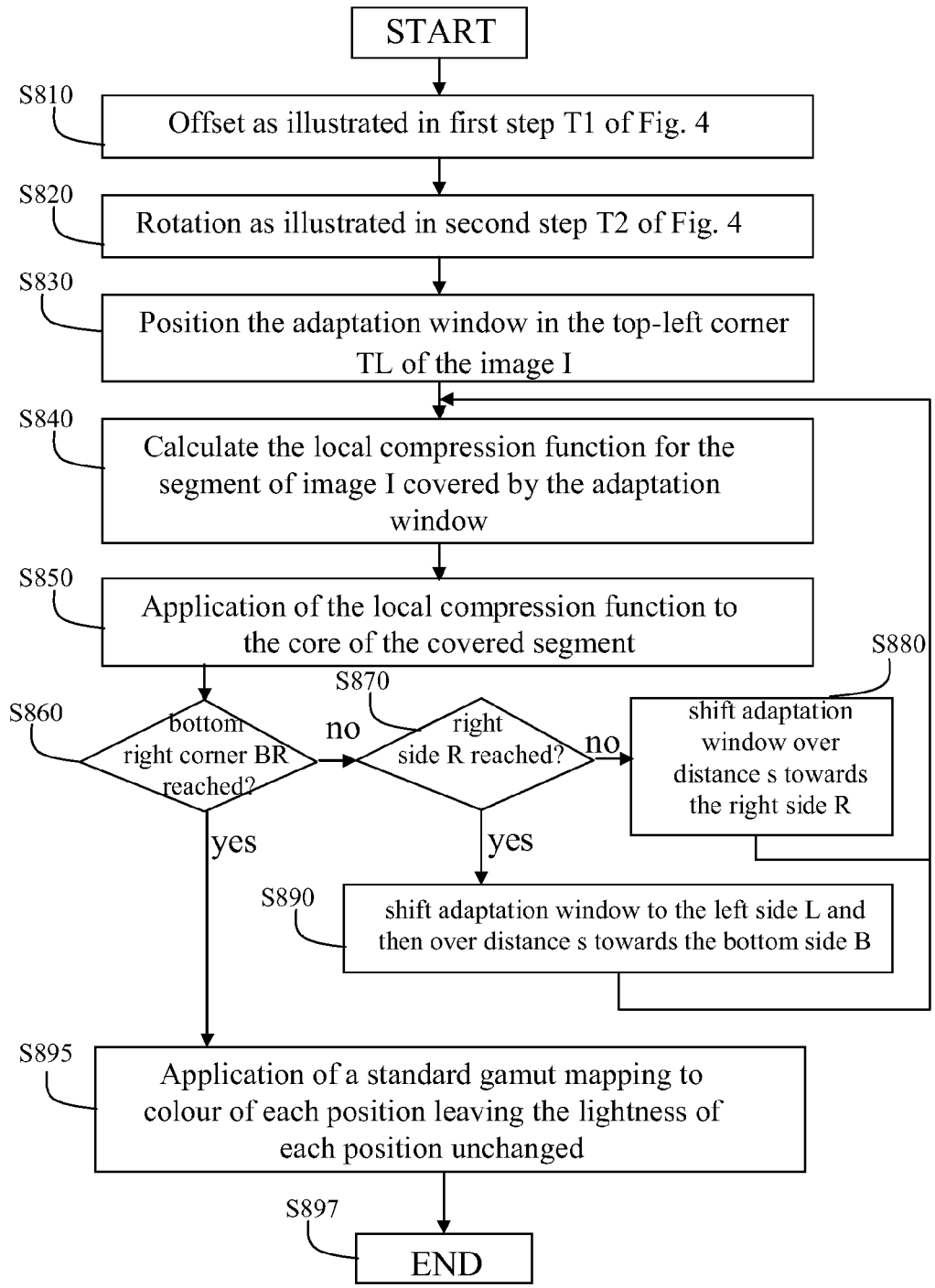
FIG. 8 is a flow diagram describing the transformation comprising local optimal compression steps according to an embodiment of the present invention.

In summary, this adaptive black-white adaptation algorithm applies a perceptually optimal local compression function to a segment of the image. The method is made up of the following steps shown in FIG. 8.

In a first step S810, the offset operation as illustrated in the first step T1 in FIG. 4 is applied on the whole image I. In a second step S820, the rotation as illustrated in the second step T2 in FIG. 4 is applied to the resulting image of the first step. In a third step S830, an adaptation window is created and positioned in the top-left corner TL of the image I. In a fourth step S840, the local compression function is calculated for the segment of the image I, which segment is covered by the adaptation window. The local compression function is tuned for the colors present in the segment as described in the embodiment above. In a fifth step S850, the local compression function is applied to the core of the covered segment, as illustrated by the compression step T3 of FIG. 4. A core 73 of a segment 71 is shown in FIG. 7. In a sixth step S860, it is checked if the adaptation window has reached to bottom-right corner BR of the image I.

If so, all segments of the image I have been operated upon, and in a last step S895, a standard gamut mapping is applied to the colors of the resulting image I. This standard gamut mapping changes the chroma components a*b* of each color, if necessary to get the color inside the printer gamut. This standard gamut mapping leaves the lightness component L* of each color unchanged. There is no need to change the lightness component of a color of the image I, since by application of the local compression function, defined above, the lightness component L* of each color of the image I is already within the printer gamut.

If not, it is checked in a seventh step S870, if the adaptation window has reached the right side R of the image I.

If so, the adaptation window is shifted in a eighth step S880 to the left side L of the image I, and then shifted over a distance s towards the bottom B of the image I, and the method returns to the fourth step S840.

If not, the adaptation window is shifted in a ninth step S890 over a distance s towards the right side R of the image I, and the method returns to the fourth step S840. For example, according to FIG. 7, the segment 71 will be shifted over a distance s being equal to 11, to the right side R of the image I, resulting in that the adaptation window covers a dashed segment 72.

Good results are achieved in experiments by the inventor with the following values for the parameters:

A: number of pieces approximately 10

Neigh: neighborhood window size of 9 of positions of colors;

Adaptation window size: 33×33, size of adaptation window in number of color positions;

s: adaptation window shift distance equal to 11, measured in number of color positions, which is also the size of each side of the core of which the colors are to be transformed;

$w_l$: hand-tuned weight of color reproduction, approximately 0.2;

$w_c$: hand-tuned weight of contrast reproduction, approximately 1.0;

$w_t$: hand-tuned weight of transition smoothness, approximately 4.0; and $\delta\alpha_{max}$: approximately 0.02 and is dependent on the maximum absolute second derivative of the compression function, may be approximately 0 to let the steepness of the compression function hardly change, may be much larger than 0 to let the steepness of the compression function freely change and may be −1 to let this constant be inactive.

Although the present invention has been described with reference to specific preferred embodiments thereof, it is to be understood that numerous variations and modifications can be made without departing from the invention.

Moreover, the above description of preferred embodiments of the invention presented a combination of specific method steps and parameter values. It is to be understood that the present invention is not limited to this specific combination of features. More particularly, these features are separable and can be combined in different sub-combinations. The scope of the invention is, thus, to be limited only as specifically mentioned in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image dependent gamut mapping method for mapping source colors of an image to destination colors reproducible by a printing apparatus, said source colors and destination colors being part of a color space comprising a lightness axis, each source color having a lightness component within a range between a source white point and a source black point on the lightness axis, and each destination color having a lightness component within a range between a destination white point and a destination black point on the lightness axis, said method comprising the steps of determining a composed transfer function that maps the source white point onto the destination white point and the source black point onto the destination black point; and applying the composed transfer function on each lightness component of source colors of at least a part of the image;

wherein said step of determining comprises the steps of:

dividing the lightness axis between the source white point and the source black point into a plurality of pieces;

defining for each piece resulting from said step of dividing, a linear mapping from said piece to a part of the lightness components of the destination colors, said linear mapping having a steepness, the value of which has to be determined;

defining the composed transfer function as a composed linear mapping consisting of the plurality of linear mappings from said step of defining the linear mapping; and determining the steepness of each linear mapping of the composed transfer function by the steps of:

defining a first measure in the color space for the distance between the lightness component of a source color and the lightness component of a corresponding destination color;

defining a second measure in the color space for the distance between a lightness contrast of neighboring source colors and a lightness contrast of corresponding neighboring destination colors;

defining a first constraint for the steepnesses in order to establish that the mapped lightness components of the source colors lie on the lightness axis between the destination black point and the destination white point; and computing, by means of mathematical optimization for said part of the image, the values of the steepnesses of the pieces, wherein said optimization takes the first measure, the second measure and the first constraint into account.

2. The method according to claim 1, wherein the mathematical optimization is a minimization of an objective function under the condition of the first constraint, the objective function comprising a first term for lightness preservation, said first term comprising the first measure for each source color in the part of the image, and a second term for contrast preservation, said second term comprising the second measure for each source color in the part of the image.

3. The method according to claim 2, wherein the minimization of the objective function is constrained by the first constraint and a second constraint by which the absolute difference of each pair of subsequent steepness values ($\alpha_i$, $\alpha_{i+1}$) is smaller than or equal to a predetermined length ($\alpha L$) multiplied by a predetermined value ($\delta\alpha_{max}$) of a maximum change of steepness.

4. The method according to claim 2, wherein the first term is proportional to a sum of a squared difference of the lightness component of each source color and the lightness component of the corresponding destination color.

5. The method according to claim 4, wherein the second term is a quadratic term defined as:

$$w_c \sum_{ij \in I} \sum_{kl \in Neigh(ij)} [(L_{ij} - L_{kl}) - (L'_{ij}(\alpha_1^A) - L'_{kl}(\alpha_1^A))]^2.$$

wherein:

$\alpha_1^A$ is a steepness vector of the steepnesses ($\alpha_1$, $\alpha_2$, $\alpha_3$, ... $\alpha_A$);

I is the image consisting of colors on position coordinates ij;

$L_{ij}$ is a value of lightness component on position ij;

$L_{ij}(\alpha_1^A)$ is a value of mapped lightness component on position ij;

Neigh(ij) is a set of neighboring positions around ij; and $w_c$ is a weight of contrast reproduction.

6. The method according to claim 2, wherein the first term is proportional to a sum of an absolute difference of the lightness component of each source color and the lightness component of the corresponding destination color.

7. The method according to claim 6, wherein the second term is an absolute value term defined as:

$$w_c \sum_{ij \in I} \sum_{kl \in Neigh(ij)} |(L_{ij} - L_{kl}) - (L'_{ij}(\alpha_1^A) - L'_{kl}(\alpha_1^A))|$$

wherein:

$\alpha_1^A$ is a steepness vector of the steepnesses ($\alpha_1$, $\alpha_2$, $\alpha_3$, ... $\alpha_A$);

I is the image consisting of colors on position coordinates ij;

$L_{ij}$ is a value of lightness component on position ij;

$(\alpha_1^A)$ is a value of mapped lightness component on position ij;

Neigh(ij) is a set of neighbouring positions around ij; and $w_c$ is a weight of contrast reproduction.

8. The method according to claim 1, wherein the composed transfer function is a global lightness compression applied to the whole image.

9. The method according to claim 2, wherein the composed transfer function is an adaptive local lightness compression, comprising a plurality of local compression functions, each of the plurality of local compression functions being defined by carrying out a global lightness compression function on a segment of the image, wherein the segments overlap and each local compression function acts only on lightness components of source colors in a middle of the corresponding segment, and a corresponding objective function of each local compression function comprises a third term for a smooth transition of corresponding steepness values between neighboring segments.

10. The method according to claim 9, wherein the third term is proportional to a sum of a sum of squared differences of steepness values of segments neighboring in a horizontal direction of the image and a sum of squared differences of steepness values of segments neighboring in a vertical direction.

11. The method according to claim 9, wherein the third term is proportional to a sum of a sum of absolute differences of steepness values of segments neighboring in a horizontal direction of the image and a sum of absolute differences of steepness values of segments neighboring in a vertical direction.

12. The method according to claim 1, wherein the composed transfer function further comprises a translation and a rotation before the application of the composed linear mapping.

13. A printing apparatus for processing a digital image, comprising a control unit adapted to perform the method according to claim 1.

14. A program stored in a non-transitory computer-readable medium for processing a digital image, said program including instructions for a computer to execute the method according to claim 1.

* * * * *